United States Patent [19]

Pietzsch et al.

[11] Patent Number: 4,523,487

[45] Date of Patent: Jun. 18, 1985

[54] DEVICE FOR POSITIONING AND POSITION STABILIZING

[75] Inventors: Ludwig Pietzsch, Karlsruhe; Harald Kauer, Ettlingen; Johannes Düren, Karlsruhe; Hugo Kühn, Marxzell-Pfaffenrot, all of Fed. Rep. of Germany

[73] Assignee: IBP Pietzsch GmbH, Ettlingen, Fed. Rep. of Germany

[21] Appl. No.: 523,617

[22] Filed: Aug. 16, 1983

[30] Foreign Application Priority Data

Aug. 3, 1983 [DE] Fed. Rep. of Germany ....... 3328031

[51] Int. Cl.³ .............................................. F41G 5/24
[52] U.S. Cl. ........................................ 74/378; 74/664; 192/21; 89/37.17; 89/41.22; 318/649
[58] Field of Search ............... 74/378, 664, 665 F, 74/665 G, 665 GA; 192/21, 48.2, 84 R, 84 AA, 84 C; 89/41 B, 37.5 A, 41 EA, 41 AA, 41 M, 41 LE, 41 MC, 41 ME; 318/649

[56] References Cited

U.S. PATENT DOCUMENTS

| | | | |
|---|---|---|---|
| 1,185,326 | 5/1916 | Humphreys | 89/37.5 A |
| 3,766,794 | 10/1973 | Wilcox | 192/21 |
| 3,901,361 | 8/1975 | Brownlie | 192/21 |
| 4,122,731 | 10/1978 | Bendure et al. | 74/664 |
| 4,182,200 | 1/1980 | Steinberg et al. | 74/664 |
| 4,243,128 | 1/1981 | Shirai | 192/35 |
| 4,326,340 | 4/1982 | Blomquist et al. | 89/41 AA |
| 4,326,447 | 4/1982 | Kauer et al. | 74/378 |
| 4,353,446 | 10/1982 | Wilken et al. | 192/21 |
| 4,430,909 | 2/1984 | Magnuson | 74/665 GA |
| 4,460,076 | 7/1984 | Yamada | 192/35 |

Primary Examiner—Raymond A. Nelli
Attorney, Agent, or Firm—L. Lawton Rogers, III

[57] ABSTRACT

A device for positioning and position stabilizing an inert mass supported for sluing on a base, comprising two driven portions (11,15) adapted to be driven by a motor (1) by way of controllable friction clutches (9,13) is furnished with a single rotor (5) driven by the motor (1) and cooperating with the two friction clutches to transmit a coupling torque in the same sense of rotation. Each driven portion (11,15) acts through separate power transmissions each (16–18,20–23) on the mass, one of the power transmissions effecting a reversal of the direction of rotation.

18 Claims, 3 Drawing Figures

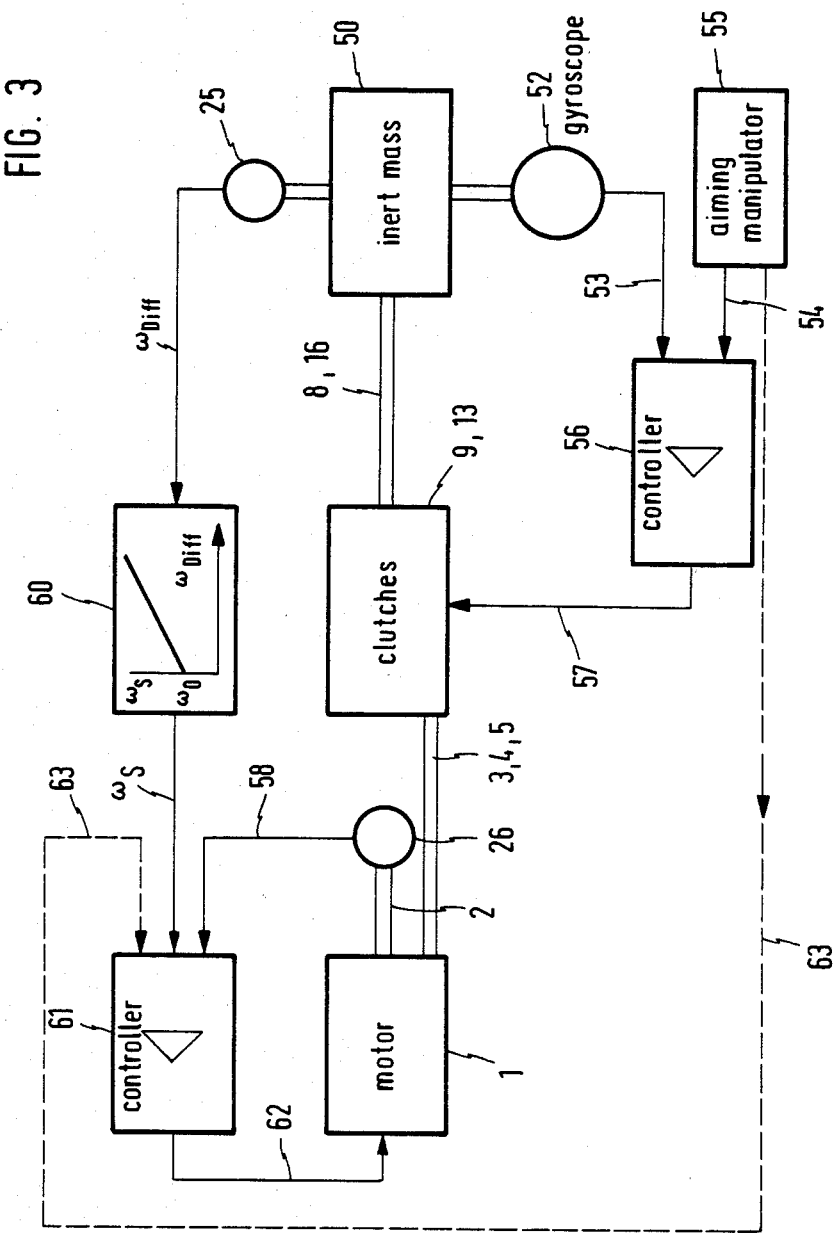

DEVICE FOR POSITIONING AND POSITION STABILIZING

FIELD OF THE INVENTION

The invention relates to a device for positioning and position stabilizing an inert mass, such as a barrelled weapon supported for sluing on a base, such as a vehicle body, comprising two driven portions adapted to be driven by one motor by way of a rotor each and a controllable friction clutch each so as to slue the mass selectively in one of its two sluing directions into a predetermined pivot position.

BACKGROUND OF THE INVENTION

Devices of this kind (U.S. Pat. Nos. 4,326,447 and 4,353,446) each comprise two constantly driven rotors which are rotatable in opposite senses and driven by the motor through a power transmission which includes two oppositely rotating drive means. One of the two friction clutches cooperates in controlled manner with each of the rotors so that torques can be transmitted to the mass in both directions of rotation. With this kind of positioning and position stabilizing of the mass the motor which always is running at high speed must permanently drive the transmission connected upstream of the two rotors. The motor speed is kept constant at a high level so that a torque will always be available as required for a quick directional change of the mass at a speed level which is higher than the interference angle speed to be expected or the desired direction or aiming angle speed. Power transmission through the clutch causes severe slipping and this entails great power loss in the clutch to be made up by the motor.

The design and construction of the transmission requires great expenditure because of the fact that the motor always rotating at a high angular or rotational speed must drive the friction clutches by a common power transmission.

This applies also to another known device for positioning and position stabilizing an inert mass with which the motor drives a single rotor only. In this case a torque is transmitted to the mass by the rotor selectively in opposite senses by each of the two friction clutches, respectively, acting through a fork-like follower frame which is fixed to the mass (German Pat. No. 27 49 913). This requires an out-of-center arrangement of the friction clutches with respect to the rotor and, moreover, an out-of-center, space-requiring arrangement of the rotor with respect to the sluing axis of the mass.

SUMMARY OF THE INVENTION

It is the main object of the invention to provide a device of the kind specified initially which is of simple structure, requires less energy and maintenance expenditure, and yet meets all demands as regards position stabilization and quick, accurate positioning of the mass in a predetermined pivot position by controlled engagement of one of the two friction clutches.

To meet this object, it is provided, in accordance with the invention, that a single rotor only is provided, that the two friction clutches are so arranged with respect to the rotor that the rotor transmits equidirectional torques to the driven portions of both friction clutches, and that the driven portions of the two friction clutches act on the inert mass each by a separate power transmission, one of which effects reversal of the direction of rotation.

The invention provides a compact device of the kind specified initially which is adapted to be centered with the pivot or sluing axis of the mass and with which only the one rotor is driven by the motor when the clutch is not operated, no upstream power transmission having to be rotated as well. This affords considerable simplification of the design without, however, impairing the position or speed control carried out as usual (e.g. according to U.S. Pat. No. 4,353,446).

As already explained, considerable slip occurs with the friction clutches of the known devices described above (U.S. Pat. Nos. 4,326,447 and 4,353,446), and this causes not only great power loss but also high thermal stress and therefore extensive wear and elevated maintenance costs of the friction clutches.

Within the limits of reducing the energy and maintenance expenditure, therefore, the invention also is intended to reduce the power loss which occurs in the friction clutches and the thermal stress of the friction clutches this involves.

To this end, an essential aspect of the invention resides in the provision of receivers to detect the motor speed and the number of revolutions at the mass end of the driven side of the friction clutches, and the speed of the motor is adapted to the rotational or angular speed at the mass end of the respective clutch by an additional motor speed control circuit. This motor speed control circuit provided in addition to the position or speed control circuit for the inert mass, according to the invention, also has its own independent significance, i.e. it provides substantial reduction of the energy and maintenance expenditure also without use of the features of the characterizing part of claim 1.

With an advantageous modification with which the motor control circuit is uncoupled from the position or speed control circuit, the rotatinonal speed of the motor is increased by subsequent feeding of current as the mass end rotational speed of the friction clutch increases.

When the direction or aiming signals become greater than the interference signals caused for instance by the movements of the base, it is convenient to limit the reference input or rated value for the position or speed control circuit, leaving the motor time to pick up speed so as to apply the desired aiming torque. In this case, the motor speed is raised by subsequent feeding of current upon application of an aiming manipulator signal. Consequently, in this case the motor control circuit and the position or speed control circuit are no longer fully uncoupled.

The motor control in accordance with the invention has the effect that the motor always is controlled to a speed which is only slightly above the minimum speed required to apply the respective desired torque. This affords a decisive reduction of the slip and thus of the power loss, i.e. the energy consumption as compared to the known control at an always constant high motor speed.

It is another advantage that "soft" transmission means, such as toothed belts may be provided between the motor and the rotor. This enlarges the design liberty and permits an especially space saving arrangement of the motor.

Additional measures are required with a device of the kind described so as to be able to block the mass in rest position or in a desired pivot position and also to be able to direct it to an approximate sluing position during the first adjustment or when the motor should fail. To this end a device of the invention comprises an additional structural group connected to the mass and consisting of a locking brake to block the mass against sluing movement and an auxiliary drive means to slue the mass, particularly by hand when the motor is at standstill.

Such a structural group was proposed before (U.S. patent application Ser. No. 24,427 filed Dec. 12, 1978). The conventional structural group is provided directly between the inert mass and the base by means of a power transmission adapted to be arrested in a direction of power flux, for instance by a brake. A hand crank is disposed so as to be coupled additionally to the input end of the power transmission. This known structural group establishes undefined conditions in passing over from motor operation to blocking or arresting or the auxiliary drive (manual drive). To avoid that and to permit the structural group to be operated passively, i.e. practically without additional energy expenditure (apart from the auxiliary energy for the auxiliary drive means) it is provided, in accordance with a further development of the invention, that the structural group comprises a planetary gearing, the hollow wheel of which is operatively connected to the mass, the web of which cooperates with the blocking brake which acts against the base, and the sun wheel of which is adapted to be coupled to the auxiliary drive means by a spring brake adapted to be lifted mechanically.

A particularly compact structure which is integrated with the stabilizing device is obtained in that the hollow wheel is operatively connected to the mass by one of the two power transmissions.

BRIEF DESCRIPTION OF THE DRAWING

The invention will be described further, by way of example, with reference to the accompanying drawings, in which:

FIG. 3 is a preferred control diagram for control of the number of revolutions of the motor in accordance with the invention.

DESCRIPTION OF THE PREFERRED EMBODIMENTS

Figure 1:
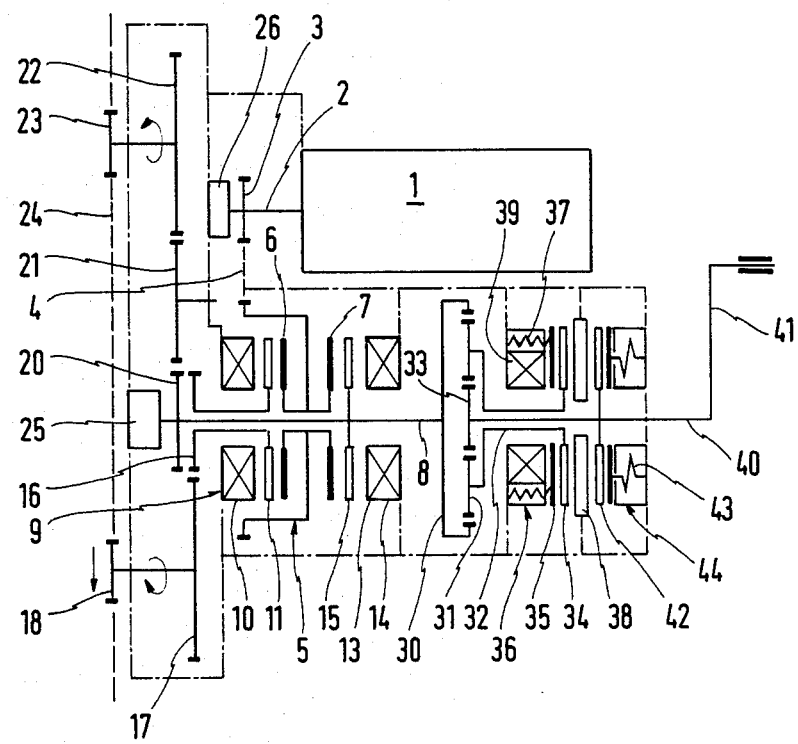
FIG. 1 is a diagrammatic presentation of a preferred device according to the invention.
Figure 2:
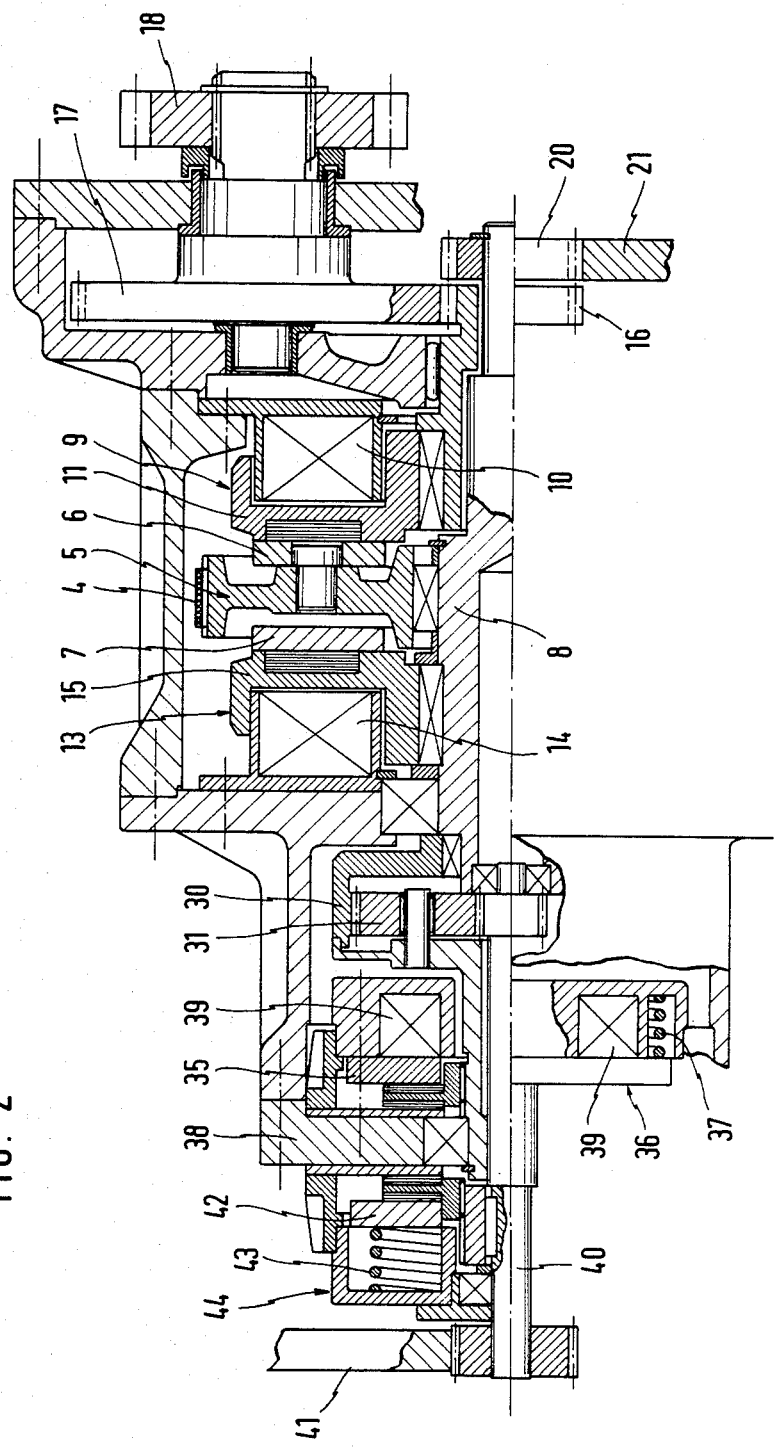
FIG. 2 is a sectional elevation of a design realized in practice in accordance with the diagram of FIG. 1.

As shown in FIGS. 1 and 2, a motor 1 drives a rotor 5 with rotor discs 6, 7 by way of the output shaft 2 provided with a gear 3 and by way of a toothed belt 4. The rotor is supported for rotation on a central shaft 8. An electromagnetic clutch 9 cooperates with the outside of the rotor disc 6, the clutch having a stationary winding 10 and a rotatable driven portion 11. In the same manner an electromagnetic clutch 13 having a stationary winding 14 and a rotatable driven portion 15 cooperates with the rotor disc 7. The driven portion 15 is connected firmly with the central shaft 8. The driven portion 11, 15 each or the rotor disc 6, 7 is provided with a friction lining. The axes of rotation of the driven portions or rings 11, 15 are aligned with the axis of rotation of the rotor 5 and the shaft 8. Driven portion 11 carries a gear 16 which meshes with a gear 17 of greater diameter. This gear 17 is connected firmly with a driven pinion 18. Gears 16 to 18 form a first gearing or power transmission.

A gear 20 having the same diameter as gear 16 is fixed on the central shaft 8. This gear 20 meshes with an intermediate gear 21 which in turn is in meshing engagement with a gear 22 of larger diameter. Gear 22 drives a driven pinion 23. Gears 20 to 23 form a second gearing or power transmission.

Both output or driven pinions 18, 23 mesh with a ring gear ring 24 connected firmly with a barrelled weapon. The center of the ring gear may coincide with the central shaft 8. Yet this is not necessary. An out-of-center arrangement of the shaft 8 may be preferred for reasons of space.

Upon operation of the electromagnetic clutch 9 rotor disc 6 is coupled with the driven portion 11 and with the first gearing 16,17,18 so that the ring gear 24 will be rotated in one direction by this first gearing. Upon operation of the electromagnetic clutch 13, the motor 1 is coupled with the driven portion 15 and thus with the second gearing 20 to 23 by way of the central shaft 8. The ring gear 24 thus is driven by the driven pinion 23 of this second gearing. By virtue of the intermediate gear 21 ring gear 24 is driven in the opposite sense of rotation as compared to being driven by driven pinion 18. The driven pinion 18 and thus the first gearing are taken along by the ring gear whereby a resistance torque acting in opposite direction to the drive torque is created at the ring gear. This will provoke a desired torque twist potential that cancels disadvantageous gear backlash in operation.

Reference numerals 25 and 26 designate receivers or speed sensors in the form of tachogenerators.

Tachogenerator 25 detects the number of revolutions of the central shaft 8 and thus of the inert mass. The number of revolutions of shaft 2 and thus of motor 1 is detected by means of tachogenerator 26.

The arrangement of the tachogenerators 25, 26 will be described below with reference to a control diagram shown in FIG. 3.

A planetary gearing is connected to shaft 8. The hollow wheel 30 of this planetary gearing is connected firmly with shaft 8. The planet wheels 31 are supported on a web 32 which carries a disc 34. The disc 34 is held pressed against a stationary disc 38 by an armature disc 35 of an electromagnetic brake 36 acting through a compression spring 37. If the winding 39 of the electromagnetic brake 36 is excited, the disc 34 is moved away from the stationary disc 38 against the pressure of the compression spring 37.

The sun wheel 33 of the planetary gearing is fast with a shaft 40 which is aligned with the central shaft 8. Mounted on the shaft 40 are a hand crank 41 and furthermore a disc 42 pressed into abutment with the stationary disc 38 by the compression spring 43 of a spring brake 44. The spring brake 44 is releasable mechanically in per se known manner (not shown) so that the disc 42 may be moved away from the disc 38.

During normal operation, i.e. when motor 1 is running, the electromagnetic brake 36 is lifted and the spring brake 44 is applied. Thus the shaft 40 and with it the sun wheel 33 are held against rotation, while web 32 may rotate. This means that also hollow wheel 30 is free to rotate with shaft 8. When the motor 1 is inoperative, the winding 39 of the electromagnetic brake ceases to be excited so that the disc 34 is pressed by compression spring 37 against the stationary disc 38. Thus the web 32 is blocked against rotation. As also sun wheel 33 is blocked by spring brake 44, the shaft 8 and with it the second gearing 20 to 23, the ring gear 24 and thus finally also the mass are blocked against sluing.

If the mass is to be slued by hand, the spring brake 44 is lifted mechanically. This unblocks the shaft 40 which may cause the sun wheel 33 to rotate by means of the hand crank 41. By the planet wheels 31 which rotate in place (web 32 is blocked) the sun wheel drives the hollow wheel 30 and thus the central shaft 8. By way of the second gearing 20 the latter rotates the ring gear 24 and thus the mass.

The structure described above prevents any undefined conditions of the mass between normal operation by motor 1, blocking state, and manual operation by crank 41.

With reference to FIG. 3 a control scheme will now be described which permits not only control of the friction clutches 9, 13 but also control of the number of revolutions of the motor 1. A first control circuit for control of the positional or rotational speed of the inert mass 50 comprises a gyroscope means 52 connected firmly with the inert mass 50. The gyroscope means supplies an actual signal 53 proportional to the sluing speed of the inert mass 50. A rated signal 54 for the reference input or rated sluing speed or the rated position of the inert mass 50 is given by an aiming manipulator 55 or a guide means (not shown). The signals 53,54 are applied to a position or speed controller 56 which compares the actual signal in per se known manner with the rated signal, taking the control deviation as the basis for an actuating signal 57 for the friction clutchs 9, 13 symbolized in FIG. 3 by a box. The rated position or rated sluing speed of the inert mass 50 is influenced in accordance with the actuating signal 57 by way of the central shaft 8 or the gear 16.

A second control circuit for control of the motor speed of motor 1 comprises the two tachogenerators 25, 26, as the rated value receiver 25 of the sluing speed difference $\omega_{Diff}$ between the inert mass 50 and the base (not shown), e.g. a barrelled weapon or tower with respect to a vehicle chassis and 26 for detecting the number of revolutions of the motor 1. Tachogenerator 26 is coupled with motor 1 by shaft 2. The differential angular speed $\omega_{Diff}$ is applied to a rated or reference input value generator 60 in which a rated signal $\omega_S$ is formed in accordance with the linear relationship between $\omega_S$ and $\omega_{Diff}$ shown in the box. If $\omega_{Diff}$ is zero, i.e. if the inert mass is not sluing with respect to the base, the motor is kept at a small minimum speed according to $\omega_O$. As the angular speed of the inert mass with respect to the base increases, i.e. as $\omega_{Diff}$ rises, the rated value $\omega_S$ is increased in accordance with the linear relation shown.

The rated value $\omega_S$ thus formed is applied to a motor speed controller 61 which takes the control deviation, i.e. the difference between signals $\omega_S$ and 58 to form a control signal 62 which is applied to motor 1. Clutches 9, 13 are influenced selectively by the arrangement shown diagrammatically in FIG. 3 as a shaft and comprising the pinion 3, belt drive 4, and rotor 5 so that the result of the motor speed control will be included in the positional control of the inert mass 50. Apart from that, however, the motor speed control circuit with controller 61 is uncoupled from the position or speed control circuit with controller 56 in the control scheme thus far described.

A discontinuous line in FIG. 3 is used to indicate that a rated signal 63 is applied in addition to the motor speed controller 61 by the aiming manipulator 55. This presents an additional opportunity which becomes important when the rated aiming signals 54 become greater than the actual interference signals 53 which are processable. In this event the rated value may be limited by the dash-line signal 63 in that, for example, the rated value actual signal 54 for the position or speed controller 56 is influenced by a logic such that first the motor speed is raised toward the aiming manipulator signal 63 by subsequent feeding of current to a value which is sufficient to provide the required torque.

With this alternative described last the two control circuits, namely the motor speed control circuit with controller 61 and the position or speed control circuit with controller 56 are coupled together. This coupling is not imperative but instead merely presents an alternative which is needed if the rated value limitation described should prove necessary in view of the conditions and circumstances described with a certain type of vehicle.

The control scheme described with reference to FIG. 3 may be used in any event to keep constant and low the slip at the clutches 9,13 no matter what the operating conditions are, i.e. even at a great $\omega_{Diff}$ of the inert mass. This is accomplished by the control described of the number of revolutions of the motor 1 and in this manner also the power loss may be kept at a low level. The motor speed controller 61 may be designed to be particularly simple if the motor speed is influenced in one sense only, e.g. raised.

As the masses (items 2 to 7 in FIGS. 1 and 2) are relatively small which the motor 1 has to accelerate with the device described, the motor can accelerate very quickly. It is only thus that the alternative mode of operation described becomes possible, namely that the motor 1 is not activated until the aiming signal 63 has been applied, whereupon the electromagnetic brake 36 is lifted.

What is claimed is:

1. A device for positioning and position stabilizing an inert mass, such as a barrelled weapon supported for sluing on a base, such as a vehicle body, comprising two driven portions adapted to be driven by one motor by way of a rotor each and a controllable friction clutch each so as to slue the mass selectively in one of its two sluing directions into a predetermined pivot position, characterized in that only a single rotor (5) is provided, in that the two friction clutches (9,13) are so arranged with respect to the rotor (5) that the rotor transmits equidirectional torques to the driven portions (11,15) of both friction clutches, and in that the driven portions (11,15) of the two friction clutches act on the inert mass by a separate power transmission each (16–18,20–23) one of which effects reversal of the direction of rotation.

2. The device as claimed in claim 1, characterized in that the friction clutches (9,13), the rotor (5), and, if desired, the inert mass have axes of rotation which are aligned.

3. The device as claimed in claim 1, characterized in that the power transmissions (16–18,20–23) are gearings acting with their output pinions (18,23) on a ring gear (24) and one of them comprising an additional intermediate gear (21).

4. The device as claimed in claim 1, characterized in that two receivers (25,26) are provided to detect the motor speed and the rotational speed at the mass end of the driven side of the friction clutches (9,13), and in that the motor speed is adapted to the mass end rotational speed by means of a motor speed control circuit.

5. The device as claimed in claim 4, characterized in that the motor speed is raised by subsequent feeding of current when the mass end rotational speed of the friction clutch rises.

6. The device as claimed in claim 4, characterized in that the motor speed is raised by subsequent feeding of current upon application of an aiming manipulator signal.

7. A device for positioning and position stabilizing an inert mass, such as a barrelled weapon supported for sluing on a base, such as a vehicle body, comprising two driven portions adapted to be driven by one motor by way of a rotor each and a controllable friction clutch each so as to slue the mass selectively in one of its two sluing directions into a predetermined pivot position, characterized in that two receivers (25,26) are provided to detect the motor speed and the rotational speed at the mass end of the driven side of the friction clutches (9,13), and in that the motor speed is adapted to the mass end rotational speed by means of a motor speed control circuit.

8. The device as claimed in claim 7, characterized in that the motor speed is raised by subsequent feeding of current when the mass end rotational speed of the friction clutch rises.

9. The device as claimed in claim 7, characterized in that the motor speed is raised by subsequent feeding of current upon application of an aiming manipulator signal (63).

10. The device as claimed in claim 7, with which the friction clutches are controllable by a position or speed controller, characterized in that the reference input value for the position or speed controller (56) is limited for the subsequent feeding of current and thus the raising of the motor speed by application of an aiming manipulator signal (63) to the motor speed control circuit.

11. The device as claimed in claim 1, characterized in that a structural group is connected with the inert mass and consists of a locking brake (36) to block the mass against sluing movement and an auxiliary drive means (41) to slue the mass, particularly by hand when the motor (1) is at standstill.

12. The device as claimed in claim 11, characterized in that the structural group comprises a planetary gearing, the hollow wheel (30) of which is operatively connected to the mass, the web (32) of which cooperates with the locking brake (36) acting against the base (disc 38), and the sun wheel (33) of which is adapted to be coupled with the auxiliary drive means (41) by a spring brake (44) adapted to be lifted mechanically.

13. The device as claimed in claim 12, characterized in that the hollow wheel (30) is operatively connected with the mass by way of one of the two power transmissions (16–18,20–23).

14. The device as claimed in claim 4, characterized in that a structural group is connected with the mass and consists of a locking brake (36) to block the mass against sluing and an auxiliary drive means (41) to slue the mass, particularly by hand when the motor (1) is at standstill.

15. The device as claimed in claim 14, characterized in that the structural group comprises a planetary gearing, the hollow wheel (30) of which is operatively connected to the mass, the web (32) of which cooperates with the locking brake (36) acting against the base (disc 38), and the sun wheel (33) of which is adapted to be coupled with the auxiliary drive means (41) by a spring brake (44) adapted to be lifted mechanically.

16. The device as claimed in claim 15, characterized in that the hollow wheel (30) is operatively connected with the mass by one of the two power transmissions (16–18,20–23).

17. A device for positioning and position stabilizing an inert mass, such as a barrelled weapon supported for sluing on a base, such as a vehicle body, comprising two driven portions adapted to be driven by one motor by way of a rotor each and a controllable friction clutch each so as to slue the mass selectively in one of its two sluing directions into a predetermined pivot position, characterized in that a structural group is connected with the mass and consists of a locking brake (36) to block the mass against sluing and an auxiliary drive means (41) to slue the mass, particularly by hand when the motor (1) is at standstill, and in that the structural group comprises a planetary gearing, the hollow wheel (30) of which is operatively connected to the mass, the web (32) of which cooperates with the locking brake (36) acting against the base (disc 38), and the sun wheel (33) of which is adapted to be coupled with the auxiliary drive means (41) by a mechanically liftable spring brake (44).

18. The device as claimed in claim 17, characterized in that the hollow wheel (30) is operatively connected with the mass by one of the two power transmissions (16–18, 20–23).

* * * * *